(12) United States Patent
Gan et al.

(10) Patent No.: US 11,549,032 B2
(45) Date of Patent: Jan. 10, 2023

(54) WATER DISPERSIBLE COPOLYMERS FOR SCAVENGING FORMALDEHYDE

(71) Applicant: SWIMC LLC, Cleveland, OH (US)

(72) Inventors: Yanchang Gan, Foshan (CN); Xi Zhao, Foshan (CN); Xiaorui Chen, Foshan (CN); Gang Duan, Northbrook, IL (US)

(73) Assignee: SWIMC LLC, Cleveland, OH (US)

( * ) Notice: Subject to any disclaimer, the term of this patent is extended or adjusted under 35 U.S.C. 154(b) by 412 days.

(21) Appl. No.: 16/369,552

(22) PCT Filed: Sep. 28, 2017

(86) PCT No.: PCT/US2017/054013
§ 371 (c)(1),
(2) Date: Mar. 29, 2019

(87) PCT Pub. No.: WO2018/064335
PCT Pub. Date: Apr. 5, 2018

(65) Prior Publication Data
US 2020/0032098 A1    Jan. 30, 2020

(30) Foreign Application Priority Data
Sep. 30, 2016 (CN) .......................... 201610878589.4

(51) Int. Cl.
| C09D 7/65 | (2018.01) |
| C09D 133/14 | (2006.01) |
| C08F 2/26 | (2006.01) |
| C08F 220/28 | (2006.01) |

(52) U.S. Cl.
CPC ........ *C09D 133/14* (2013.01); *C08F 220/283* (2020.02); *C09D 7/65* (2018.01); *C08F 2800/20* (2013.01)

(58) Field of Classification Search
None
See application file for complete search history.

(56) References Cited

U.S. PATENT DOCUMENTS

| 5,143,954 A | 9/1992 | Hutton et al. | |
| 5,939,482 A * | 8/1999 | Kriessmann | C08F 265/04 524/460 |

FOREIGN PATENT DOCUMENTS

| AU | 2012255217 | 12/2012 |
| CN | 101061192 | 10/2007 |
| CN | 105273539 | 1/2016 |
| CN | 105603783 | 5/2016 |
| JP | H1189920 | 4/1999 |
| JP | 2004129926 | 4/2004 |
| JP | 2004148221 | 5/2004 |
| WO | 9743325 | 11/1997 |
| WO | 2006065914 | 6/2006 |

OTHER PUBLICATIONS

Extended European Search Report issued for appl. No. 17857418.2, dated Apr. 23, 2020 (6 pages).
First Office Action issued for Chinese patent appl No. 201610878589.4, dated Dec. 19, 2019 (16 pages, including English translation).
F. Del Rector et al., "Applications for Acetoacetyl Chemistry in Thermoset Coatings," Paint & Coating Industry, vol. 1 (1996), p. 26-31 (English abstract).
Sun Yuxiu et al., Selection from Coating Formulation Selection, China Textile & Apparel Press (2012) p. 275-277 (English abstract).
Zhang Yubo et al., "Structure and Properties of Cured Film Based on Acrylate/Aziridine 2K Waterborne Coatings," Paint & Coating Industry, vol. 44, No. 1 (2014), p. 25-32 (English abstract).
PCT International Preliminary Report of Patentability, dated Apr. 11, 2019.
European Office Action for appl. No. 17857418.2, dated May 23, 2022 (3 pages).
International Search Report & Written Opinion issued for appl. No. PCT/US2017/054013, dated Jan. 10, 2018, 10 pages.
Third Office Action issued for Chinese patent appl. No. 201610878589.4, dated Mar. 22, 2021 (18 pages, including English translation).
Zhang, et al. "Water Based Coatings—Raw material selection, Formulation design and Production process" dated Jan. 31, 2000, China Light Industry Press, 8 pages (including English translation of abstract).
Second Office Action issued for Chinese patent appl. No. 201610878589.4, dated Sep. 15, 2020 (16 pages, including English translation).

* cited by examiner

*Primary Examiner* — Sheeba Ahmed

(57) ABSTRACT

The present invention is a water dispersible copolymer for scavenging formaldehyde, the copolymer being based on acrylic copolymer comprising one or more acetoacetyl functional groups and one or more hydrophilic groups chemically bonded to its molecular backbone, wherein the acrylic copolymer has a number average molecular weight of 2000-100,000 g/mol; and wherein the acrylic copolymer comprises between 10 wt % and 30 wt % of the acetoacetyl functional groups relative to the weight of the acrylic copolymer. The present invention also refers to an aqueous dispersion containing said water dispersible copolymer, as well as an article coated by a coating comprising the aqueous dispersion.

18 Claims, No Drawings

WATER DISPERSIBLE COPOLYMERS FOR SCAVENGING FORMALDEHYDE

CROSS REFERENCE TO RELATED APPLICATION

This application is a national stage entry under 35 U.S.C. § 371 of PCT Application No.: PCT/US2017/054013, filed Sep. 28, 2017, which claims the benefit of Chinese Application No.: CN2016108785894, filed on Sep. 30, 2016. The entire contents of PCT Applications No.: PCT/US2017/054013 and Chinese Application No.: CN2016108785894 are incorporated herein by reference.

TECHNICAL FIELD

The present invention refers to water dispersible acrylic copolymer for scavenging formaldehyde, wherein the acrylic copolymer comprises one or more acetoacetyl functional groups and one or more hydrophilic groups chemically bonded to its molecular backbone. The present invention also refers to an aqueous dispersion containing particles of the water dispersible acrylic copolymer, a coating composition comprising the aqueous dispersion, as well as an article coated by the coating composition.

BACKGROUND

Formaldehyde, as an important chemical, is widely used in the manufacture of building materials and a large number of household products, such as for wood processing, textile industry, leather processing, architectural coating and other applications. However, formaldehyde is a highly toxic organic compound. For example, formaldehyde has been recognized as a human carcinogen by the International Agency for Research on Cancer. Due to the health problems caused by formaldehyde, various industry standards tend to strictly limit the formaldehyde content.

As people become more concerned about health and environmental issues, the products are required to be capable of not only providing the desired functions of product and convenience, but also providing lower toxicity and better environment-friendly performance. Aqueous coating composition attracts more and more attentions due to its inherent health and environmental characteristics. Even so, it is still desirable to further reduce the formaldehyde content of the aqueous coating composition. In one solution, emulsions with formaldehyde scavenging functions, such as SF-506 and 33014 from DOW, are used. However, these products for scavenging formaldehyde are expensive and have insufficient formaldehyde scavenging efficiency, which limits their versatility. In an alternative solution, some multifunctional amine compounds are used as formaldehyde scavenging agents. However, these amine compounds are unstable in the air, have low formaldehyde scavenging efficiency, and even adversely affect the performance of the paint.

Thus, there is still a need for a product with improved formaldehyde scavenging efficiency.

SUMMARY

According to an aspect of the invention, an aqueous dispersion having formaldehyde scavenging function is provided, wherein the dispersion comprises at least particles of acrylic copolymer comprising one or more acetoacetyl functional groups and one or more hydrophilic groups chemically bonded to its molecular backbone, wherein the acrylic copolymer has a number average molecular weight of 2000-100000 g/mol; and wherein the acrylic copolymer comprises between 10 wt % and 30 wt % of the acetoacetyl functional groups relative to the weight of the acrylic copolymer.

In an embodiment of the invention, the particles are prepared through emulsion polymerization using monomers comprising: i) 30 to 90 wt % of at least one ethylenically unsaturated monomer containing —C(=O)CH$_2$C(=O)— functional group; ii) 0.1-15 wt % of at least one ethylenically unsaturated monomer containing a hydrophilic group; and iii) 0-60 wt % of at least one ethylenically unsaturated monomer other than monomers i) and ii), wherein the wt % is relative to the total weight of the monomers i), ii) and iii).

Another aspect of the invention provides a coating composition comprising the aqueous dispersion according to the invention.

A further aspect of the invention refers to use of the aqueous dispersion according to the invention as a formaldehyde-scavenging product.

A further aspect of the invention provides an article comprising a substrate and a coating thereon comprising the aqueous dispersion according to the invention.

A yet further aspect of the invention provides an acrylic copolymer comprising one or more acetoacetyl functional groups and one or more hydrophilic groups chemically bonded to molecular backbone of the acrylic copolymer, wherein the acrylic copolymer has a number average molecular weight of 2000-100000 g/mol; and wherein the acrylic copolymer comprises between 10 wt % and 30 wt % of the acetoacetyl functional groups relative to the weight of the acrylic copolymer.

The inventors have found that the aqueous dispersion according to the invention has excellent formaldehyde scavenging properties. Moreover, the inventors have found that such aqueous dispersion is suitable for use as formaldehyde scavenger for various coating compositions including aqueous coating compositions and solvent coating compositions without adversely affecting them, and thus is useful in a wide range of applications. In addition, the inventors have also found that the process for the production of the aqueous dispersion is simple and results in a remarkably reduced cost.

The details of one or more embodiments of the invention are set forth in the following description. Other features, objects and advantages of the invention will become apparent from the description and the claims.

Selected Definitions

As used herein, "a," "an," "the," "at least one," and "one or more" are used interchangeably. Thus, for example, a coating composition that comprises "an" additive can be interpreted to mean that the coating composition includes "one or more" additives.

Throughout the present invention, where compositions are described as having, including, or comprising specific components or fractions, or where processes are described as having, including, or comprising specific process steps, it is contemplated that the compositions or processes as disclosed herein may further comprise other components or fractions or steps, whether or not specifically mentioned in this invention, as long as such components or steps do not affect the basic and novel characteristics of the invention, but it is also contemplated that the compositions or processes may consist essentially of, or consist of, the recited components or steps.

For the sake of brevity, only certain ranges are explicitly disclosed herein. However, ranges from any lower limit may be combined with any upper limit to recite a range not explicitly recited, ranges from any lower limit may be combined with any other lower limit to recite a range not explicitly recited, and in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited. For example, the range of 1 to 5 includes but not limited to the invention of the following ranges: 2 to 4, 3 to 4, 2 to 5, 1 to 4, 1.5 to 4.5, 2.5 to 3.5, 1.02 to 4.81, etc.

As used herein, the term "acetoacetyl" refers to the acetoacetyl functional group of the structure of

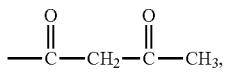

which can be derived from $C_{1-8}$ alkylene (meth)acrylate acetoacetate.

As used herein, in the context of a substance, the terms "water dispersibility" and "water dispersible" mean that such substance can be mixed with water (or aqueous vehicle) so that a stable mixture is formed. A copolymer may be water dispersible by introducing an anionic water-dispersing group, a cationic water-dispersing group or a nonionic water-dispersing group. In the present invention, the water dispersibility of the copolymer is introduced via an anionic water-dispersing group.

As used herein, the phrase "an aqueous dispersion" refers to a stable suspension of synthetic resin (i.e. polymer) microparticles in an aqueous liquid medium, optionally stabilized with the aid of a suitable dispersion aid, such as a surface active agent.

The phrase "ethylenically unsaturated monomer" refers to any monomer containing an ethylenically unsaturated group (C=C). As used herein, the phrase "a further ethylenically unsaturated compound" (i.e. ethylenically unsaturated monomer other than monomers i) and ii)) comprises any ethylenically unsaturated compound capable of undergoing free radical polymerization, including, but not limited to, styrenes, haloalkenes, vinyl acetate, and (meth)acrylates.

As used herein, the term "(meth)acrylic acid" compound (where "meth" is bracketed) is meant to include both acrylic acid and methacrylic acid.

As used herein, in the context of structural unit derived from something, the phase "derived from" means that the structural unit is obtained or obtainable from something, such as by esterification, neutralization, or radical polymerization.

As used herein, the phrase "an organic moiety" refers to a portion derived from an organic compound comprising carbon, hydrogen, and optionally, oxygen, nitrogen, sulfur, phosphorus, and so on. When used in the context of the bridging group represented by "Bg", the divalent organic moiety may be alkylene, arylene, alkarylene, aralkylene or combination, preferably having 1 to 20 carbon atoms.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

DETAILED DESCRIPTION

According to an aspect of the invention, a water dispersible acrylic copolymer having formaldehyde scavenging function is provided, wherein the copolymer comprises one or more acetoacetyl functional groups and one or more hydrophilic groups chemically bonded to molecular backbone of the acrylic copolymer.

Preferably, the acrylic copolymer has a number average molecular weight (Mn) of from 2000 to 100000 g/mol, more preferably from 4000 to 60000 g/mol, yet more preferably from 6000 to 40000, even more preferably from 8000 to 25000 g/mol, and most preferably from 9000 to 20000 g/mol. The number average molecular weight can be determined by GPC.

Preferably, the acrylic copolymer comprises between from 1 wt % to 70 wt %, more preferably from 5 wt % to 60 wt %, yet more preferably from 7 wt % to 50 wt %, yet more preferably from 8 wt % to 40 wt %, even more preferably from 10 wt % to 30 wt %, and most preferably from 12 wt % to 25 wt % of the acetoacetyl functional groups, relative to the weight of the acrylic copolymer. The amount of acetoacetyl functional groups can be determined by the below equation:

$$C_{acetoacetyl\ functional\ groups}\ (\text{wt \%}) = n \times M_{acetoacetyl\ functional\ groups} / W_{copolymer}$$

wherein $C_{acetoacetyl\ functional\ groups}$ represents the concentration of acetoacetyl functional groups;

n represents the total number of moles of acetoacetyl functional groups in the acetoacetyl group-containing copolymer used to prepare the aqueous dispersion;

$M_{acetoacetyl\ functional\ groups}$ represents the molar mass of acetoacetyl functional groups;

$W_{copolymer}$ represents the total weight of copolymer.

In some embodiments, the copolymer according to the invention may have one or more anionic hydrophilic groups and/or one or more nonionic hydrophilic groups, preferably having one or more anionic hydrophilic groups. Thus, the acrylic copolymer of the present invention can be widely used in various aqueous systems. In some embodiments of the present invention, the anionic hydrophilic group is in the form of acid, such as carboxylic acid groups, sulfonic acid groups, phosphoric acid groups, phosphonic acid groups, phosphonite groups, and the like. In further embodiments of the invention, the anionic hydrophilic group is in the form of salt, such as neutralized acid or anhydride groups. Suitable examples of the anionic hydrophilic group in the form of salt comprise a carboxylate ion (—COO$^-$), a sulfate ion, a phosphate group, a sulfonate ion, a phosphonite ion, phosphonate ion, or combinations thereof. In certain embodiments, a carboxylate ion is preferred. In some other embodiments, the anionic hydrophilic group is selected from the group consisting of carboxyl group, sulfo group, phosphinate group, phosphono group, phosphonic acid group, or combinations thereof.

Preferably, the acrylic copolymer of the invention has the following formula I:

Formula I

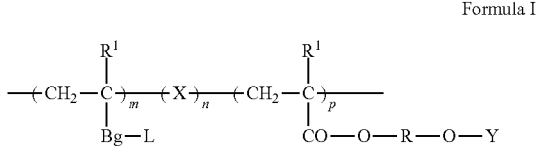

in which each $R^1$ independently represents H or methyl; Bg represents a divalent organic moiety or Bg is void; L represents a hydrophilic group; R represents a divalent saturated hydrocarbyl, preferably having 1 to 20 carbon atoms, Y represents acetoacetyl; and X represents a structural unit derivable from further ethylenically unsaturated monomers other than ethylenically unsaturated monomers containing —C(=O)CH$_2$C(=O)— functional group and ethylenically unsaturated monomers containing a hydrophilic group L, and wherein the structural units are connected with each other in arbitrary order, the subscripts m, n and p represent the statistic sum of the corresponding structural units, respectively, with m being an integer in the range of 1 to 15, n being an integer in the range of 0 to 40 and p being an integer in the range of 15 to 80.

It is to be noted that in the acrylic copolymer according to the present invention, the order in which the monomers are arranged is not critical. Acrylic copolymers containing monomers in different orders are considered to have the same or similar effects in terms of product performance concerned by the present invention. Thus, the copolymers according to the present invention may have different monomer orders (sequences). The above formula (I) essentially covers copolymers of different monomer orders.

In a preferred embodiment of the invention, Bg is void. Where Bg is void, L is bonded directly to the backbone. In another preferred embodiment of the invention, Bg is a divalent organic moiety, such as alkylene, arylene, alkarylene, aralkylene or combination having 1 to 20 carbon atoms, for example phenylene.

In a preferred embodiment of the invention, L is anionic hydrophilic group. The preferences of L are as above described for "anionic hydrophilic group".

In a preferred embodiment of the invention, X can be derived from styrene, α-methyl styrene, vinyl toluene, vinyl naphthalene, vinyl acetate, vinyl versatate, acrylonitrile, methacrylonitrile, $C_1$-$C_{20}$ alkyl esters of (meth)acrylic acid, alkoxyalkyl (meth)acrylates; or the combination thereof.

In a preferred embodiment of the invention, R can be selected from divalent saturated $C_1$-$C_{10}$ alkyl, preferably methylene, ethylene, and propylene.

In a preferred embodiment of the invention, m is an integer in the range of 1 to 15, preferably an integer in the range of 3 to 12, more preferably an integer in the range of 4 to 8; n is an integer in the range of 2 to 38, preferably an integer in the range of 5 to 35, more preferably an integer in the range of 10 to 30, even more preferably an integer in the range of 15 to 25; and/or, p is an integer in the range of 20 to 70, preferably an integer in the range of 25 to 60, more preferably an integer in the range of 30 to 50.

The copolymer according to the invention has good dispersibility in water and is stable in the form of an aqueous dispersion.

Aqueous Dispersion

According to an aspect of the invention, an aqueous dispersion is provided, wherein the dispersion comprises at least particles of acrylic copolymer comprising one or more acetoacetyl functional groups and one or more hydrophilic groups chemically bonded to its molecular backbone. The acrylic copolymer is one or more copolymers according to the invention and can also be various embodiments as illustrated above and other variants thereof.

Preferably, the particles have an average particle size of no greater than 100 nm, more preferably no greater than 70 nm, yet more preferably no greater than 50 nm, even more preferably no greater than 40 nm, and most preferably no greater than 30 nm, as measured by dynamic light scattering method.

In an embodiment of the invention, the particles has a glass transition temperature of 50° C. or more, preferably 60° C. or more, even more preferably 70° C. or more. The glass transition temperature of the particles can be lower than 200° C., preferably lower than 150° C., more preferably lower than 120° C., even more preferably lower than 100° C., most preferably lower than 80° C. The glass transition temperature can be measured by differential scanning calorimetry, such as with TA DSC Q2000 system, for example.

In an embodiment of the invention, the aqueous dispersion according to the invention has a solid content of from 15 to 55%, more preferably from 20 to 45%, yet more preferably from 26 to 38%, most preferably from 25 to 55%.

In an embodiment of the invention, the aqueous dispersion according to the invention has a pH in the range of 6.5 to 9.5, more preferably 7 to 9, even more preferably 7.2 to 8.7, most preferably 7.4 to 8.5.

According to the invention, the particles are prepared through emulsion polymerization using monomers comprising:

i) 30 to 90 wt % of at least one ethylenically unsaturated monomer containing a —C(=O)CH$_2$C(=O)— functional group;

ii) 0.1-15 wt % of at least one ethylenically unsaturated monomer containing a hydrophilic group; and iii) 0-60 wt % of at least one further ethylenically unsaturated monomer other than monomers i) and ii), wherein the wt % is relative to the total weight of the monomers 1), ii) and iii).

Preferably, the amount of the ethylenically unsaturated monomer i) is in the range of 35 to 85 wt %, more preferably 45 to 85 wt %, most preferably 50 to 80 wt %, relative to the total weight of the monomers i), ii) and iii).

Preferably, the amount of the ethylenically unsaturated monomer ii) is in the range of 0.1 to 20 wt %, more preferably 0.5 to 18 wt % yet more preferably 0.7 to 16 wt %, yet more preferably 1 to 14 wt %, yet more preferably 3 to 12 wt %, yet more preferably 5 to 11 wt %, even more preferably 6 to 10 wt %, relative to the total weight of the monomers i), ii) and iii).

Preferably, the amount of the ethylenically unsaturated monomer iii) is in the range of 0.1 to 55 wt %, more preferably 0.5 to 52 wt %, yet more preferably 1 to 50 wt %, yet more preferably 5 to 48 wt %, yet more preferably 10 to 45 wt %, yet more preferably 14 to 43 wt %, even more preferably 15 to 42 wt %, relative to the total weight of the monomers i), ii) and iii).

In some preferred embodiments, the ethylenically unsaturated monomer i) comprises $C_{1-10}$ alkylene (meth)acrylate acetoacetate, more preferably $C_{1-8}$ alkylene (meth)acrylate acetoacetate, more preferably $C_{1-6}$ alkylene (meth)acrylate acetoacetate, even more preferably $C_{1-4}$ alkylene (meth)acrylate acetoacetate, or mixture thereof. Examples of the ethylenically unsaturated monomer 1) may include 2-(Acetoacetoxy)ethyl methacrylate (AAEM), acetoacetoxyethyl acrylate, acetoacetoxypropyl methacrylate, acetoacetoxypropyl acrylate, acetoacetoxybutyl methacrylate, acetoacetoxybutyl acrylate, acetoacetoxypentyl methacrylate, acetoacetoxypentyl acrylate, acetoacetoxyhexyl methacrylate, acetoacetoxyhexyl acrylate, or mixtures thereof.

In some preferred embodiments, the ethylenically unsaturated monomer ii) has an anionic hydrophilic group or a non-ionic hydrophilic group, preferably an anionic hydrophilic group. The anionic hydrophilic group may be such as carboxyl group, sulfo group, phosphinate group, phosphono group, and phosphonic acid group. Examples of the ethylenically unsaturated monomer ii) may include acrylic acid, methacrylic acid, beta-acryloxy propionic acid, ethacrylic acid, alpha-chloroacrylic acid, crotonic acid, alpha-phenylacrylic acid, cinnamic acid, chlorocinnamic acid, and the combination thereof.

In some preferred embodiments, the ethylenically unsaturated monomer iii) may be selected from the group consisting of styrene, alpha-methylstyrene, vinyltoluene, vinylnaphthalene, vinyl acetate, vinyl versatate, acrylonitrile, methacrylonitrile, $C_{1-20}$ alkyl esters of (meth)acrylic acid, alkoxyalkyl (meth)acrylate and the combination thereof.

According to the invention, the emulsion polymerization process is well known in the art. One of ordinary skill in the art is capable of determining the appropriate conditions and procedures for the emulsion polymerization process according to the desired properties of product.

In an embodiment of the invention, the emulsion polymerization may be initiated by a free radical initiator, optionally with the aid of an emulsifier, under an inert gas (e.g., nitrogen) or an air atmosphere. Preferably, the emulsion polymerization can also be carried out in an atmosphere of air and/or nitrogen when the substances involved in the reaction substantially unreactive with oxygen.

The emulsion polymerization according to the present invention may be performed by using a water-soluble free radical initiator such as hydrogen peroxide, persulfate or a water-soluble oxidative-reduction initiator system. In an embodiment of the present invention, persulfate is used, for example those selected from the group of alkali metal persulfates (e.g., sodium persulfate, potassium persulfate and lithium persulfate), ammonium persulfate, or combinations thereof. In another embodiment of the invention, a water-soluble oxidative-reduction initiator system is used, wherein the oxidant is selected from the group of hydrogen peroxides, hydroperoxides, persulfates and combinations thereof, and the reductant is selected from the group of sulfites, such as alkali metal metabisulfites, bisulfites, hydrosulfites, sodium formaldehyde sulfoxylate, reducing sugars such as ascorbic acid and isoascorbic acid, and combinations thereof. In an embodiment of the invention, ammonium persulfate is preferably used. The amount of initiator is preferably from 0.01 wt % to 3 wt %, based on the total amount of monomers.

Optionally, the polymers may be stabilized by one or more nonionic or anionic emulsifiers (i.e., surfactants), used either alone or together. Examples of suitable nonionic emulsifiers include tert-octylphenoxyethylpoly(39)-ethoxyethanol, dodecyloxypoly(10)ethoxyethanol, nonylphenoxyethyl-poly(40)ethoxyethanol, polyethylene glycol 2000 monooleate, ethoxylated castor oil, fluorinated alkyl esters and alkoxylates, polyoxyethylene (20) sorbitan monolaurate, sucrose monococoate, di(2-butyl)phenoxypoly(20) ethoxyethanol, hydroxyethylcellulose polybutyl acrylate graft copolymer, dimethyl silicone polyalkylene oxide graft copolymer, poly(ethylene oxide)poly(butyl acrylate) block copolymer, block copolymers of propylene oxide and ethylene oxide, 2,4,7,9-tetramethyl-5-decyne-4,7-diol ethoxylated with 30 moles of ethylene oxide, N-polyoxyethylene (20)lauramide, N-lauryl-N-polyoxyethylene(3)amine, and poly(10)ethylene glycol dodecyl thioether. Examples of suitable anionic emulsifiers include sodium lauryl sulfate, sodium dodecylbenzenesulfonate, potassium stearate, sodium dioctyl sulfosuccinate, sodium dodecyldiphenyloxide disulfonate, nonylphenoxyethylpoly(1)ethoxy ethyl sulfate ammonium salt, sodium styrene sulfonate, sodium dodecyl allyl sulfosuccinate, linseed oil fatty acid, sodium or ammonium salts of phosphate esters of ethoxylated nonylphenol, sodium octoxynol-3-sulfonate, sodium cocoyl sarcocinate, sodium 1-alkoxy-2-hydroxypropyl sulfonate, sodium alpha-olefin ($C_{14}$-$C_{16}$) sulfonate, sulfates of hydroxyalkanols, tetrasodium N-(1,2-dicarboxy ethyl)-N-octadecylsulfosuccinamate, disodium N-octadecylsulfosuccinamate, disodium alkylamido polyethoxy sulfosuccinate, disodium ethoxylated nonylphenol half ester of sulfosuccinic acid and the sodium salt of tert-octylphenoxyethoxypoly(39)ethoxy ethyl sulfate. In an embodiment of the invention, sodium lauryl sulfate is preferably used as an emulsifier. Various combinations of emulsifiers can be used, if desired.

In the emulsion polymerization, the amount of emulsifier is not strictly defined. One of ordinary skill in the art can appropriately adjust the amount of emulsifier according to the desired stability of the formulation and product. In general, under the premise of the stable product, the lower amount of emulsifier is desirable, because the resulting product can have an increased water resistance of dry film.

Optionally, for purposes of regulating the molecular weight of the polymer, chain-transfer agent may be used. Suitable chain-transfer agents include well known halo-organic compounds, such as, carbon tetrabromide and dibromodichloromethane; sulfur-containing compounds such as the alkylthiols including ethanethiol, butanethiol, tert-butyl mercaptoacetate and ethyl mercaptoacetate, as well as the aromatic thiols; or various other organic compounds having hydrogen atoms which are readily abstracted by free radicals during polymerization. Additional suitable chain-transfer agents or ingredients include but are not limited to butyl mercaptopropionate; isooctyl mercapto propionic acid; isooctyl mercaptopropionate ("IOMP"); bromoform; bromotrichloromethane ("BTCM"); carbon tetrachloride; alkyl mercaptans such as 1-dodecanethiol, tertiary-dodecyl mercaptan, octyl mercaptan, tetradecylmercaptan, and hexadecylmercaptan; alkyl thioglycolates such as butylthioglycolate, isooctylthioglycolate, and dodecyl thioglycolate; thioesters; or combinations thereof. In an embodiment of the invention, 1-dodecanethiol is preferred as a chain-transfer agent.

According to the invention, all or substantially all of the monomers are involved in the emulsion polymerization reaction, and the amount of residual monomer in the resulting aqueous dispersion is very small. Thus, according to the invention, it is reliable to use the ratio of the starting materials to calculate the relative content of each fragment in the resulting copolymer.

Coating Composition and Other Applications

The copolymers and aqueous dispersions according to the present invention have good miscibility with other components in the aqueous coating composition, for example, they can be well mixed with aqueous coatings for wood, walls and the like. In practice, the copolymers and aqueous dispersions according to the present invention can be applied directly to aqueous coating compositions, for example as film-forming resin components or as formaldehyde-removing additives. Thus, according to another aspect of the present invention, an aqueous coating composition comprising a copolymer or an aqueous dispersion according to the present invention is provided.

The amount of the copolymer or aqueous dispersion according to the present invention in the aqueous coating composition may vary over a wide range. Preferably, the amount of the copolymer or dispersion according to the present invention may be in the range of 0.1 to 90% by weight, preferably 0.3-80% by weight, more preferably 0.5 to 70% by weight, even more preferably from 1.0 to 60% by weight, based on the total weight of the coating composition. In some embodiments, the amount of the copolymer or dispersion according to the present invention is in the range of 0.5 to 5.0% by weight, such as 1.0, 1.5, 2.0, 2.5, 3.0, 5.0% by weight, based on the total weight of the coating composition.

The aqueous coating composition may also comprise aqueous polymer latex. Examples of the aqueous polymer latex include organic silicone aqueous latex, acrylic aqueous latex, epoxy type aqueous latex, urethane type aqueous latex, vinyl polymer aqueous latex or combinations thereof, and other aqueous polymer latexes suitable for use in aqueous coating compositions latex.

In particular, the aqueous polymer latex may be organic silicone aqueous latex, styrene-acrylate aqueous latex, acrylate aqueous latex, organic silicone-modified acrylate aqueous latex, phenolic epoxy aqueous latex, a cyanuric epoxy aqueous latex, ethylene oxide-propylene oxide copolymer aqueous latex, vinyl acetate aqueous latex, vinyl acetate-acrylate aqueous latex, vinyl acetate-ethylene aqueous latex, ethylene-vinyl acetate aqueous latex, vinyl acetate-acrylate-tertiary carbonate aqueous latex, acrylate modified polyurethane aqueous latex and combinations thereof.

In the coating composition according to the present invention, the content of the aqueous polymer latex is preferably in the range of 20 to 99 wt %, preferably in the range of 40 to 96 wt %, more preferably in the range of 50 to 80 wt %, or in the range of 60 to 80 wt % or in the range of 64 to 76 wt %, preferably in the range of 64 to 72 wt %, relative to the total weight of the aqueous coating composition.

Optionally, the coating composition according to the invention may further comprise one or more fillers. As used herein, the term "filler" refers to any volume extender, which is, for example, an organic or inorganic volume extender in particulate form. The volume of the filler may vary over a wide range, for example in the range of about 50 microns to about 10 nanometers. Suitable exemplary fillers include, for example, kaolin, titanium oxide, calcium carbonate, diatomaceous earth, talc, barium sulfate, magnesium aluminum silicate, silica, and any combination thereof. In a preferred embodiment, the filler may comprise titanium oxide, kaolin, calcium carbonate, diatomaceous earth, or a combination thereof. As an example of titanium oxide, rutile titanium dioxide R289 available from Panzhihua Iron and Steel Co., Ltd. can be used. As an example of kaolin, calcined kaolin BR95, available from Shanxi Jinyang Calcined Kaolin Co., Ltd., may be used. As an example of calcium carbonate, calcium carbonate GF117 available from China Guangfu Building Materials Co., Ltd., may be used. As an example of diatomaceous earth, diatomaceous earth Celite 499 available from World Minerals, USA can be used.

According to the present invention, the total amount of filler may vary over a wide range, for example, from about 0% to about 70% by weight, preferably from about 30% to about 65% by weight, based on the total weight of the composition. In particular, the aqueous coating composition comprises from about 35% by weight, about 40% by weight, about 44% to about 60% by weight, about 55% by weight, or about 50% by weight of filler, relative to the total weight of the coating composition.

Optionally, the coating composition may further comprise additional additives commonly used in the coating composition. Suitable additional additives include, for example, those that improve the processability or manufacturability of the composition, enhance composition aesthetics, or improve a particular functional property or characteristic of the coating composition or the cured composition resulting therefrom, such as adhesion to a substrate. Additives that may be included are, for example, carriers, emulsifiers, pigments, anti-migration aids, anti-microbials, extenders, lubricants, wetting agents, biocides, plasticizers, anti-foaming agents, colorants, waxes, antioxidants, anticorrosion agents, flow control agents, thixotropic agents, dispersants, adhesion promoters, UV stabilizers, a thickener, a defoamer, a pH adjuster, or combinations thereof. Each optional ingredient can be included in a sufficient amount to serve its intended purpose, but preferably not in such an amount to adversely affect the coating composition or a cured coating resulting therefrom. In a preferred embodiment of the invention, suitable additional additives may include a thickener, a dispersing agent, a defoamer, a pH adjuster, a bactericide, a fungicide, or any combination thereof.

In preferred embodiments, the coating composition of the invention comprises about 0 to 10 wt %, preferably about 1 to about 8 wt % of additional additive, relative to the total weight of the coating composition. Particularly, the total amount of additives present in the coating composition may be from about 0.2 wt %, 0.3 wt %, about 0.5 wt %, about 0.8 wt %, about 1.0 wt %, about 1.5 wt % or about 2.0 wt % to about 9.0 wt %, about 7.0 wt %, about 5.0 wt %, about 4.5 wt %, about 4.0 wt %, about 3.5 wt % or about 3.0 wt %, relative to the total weight of the coating composition.

The copolymer and/or aqueous dispersion according to the present invention have a higher formaldehyde scavenging efficiency. Thus, according to yet another aspect of the present invention, use of a copolymer and/or aqueous dispersion according to the invention as a formaldehyde scavenging product is provided. In an embodiment of the present invention, the copolymer and/or aqueous dispersion according to the present invention may be incorporated into aqueous latex paints as a formaldehyde scavenging additive.

The inventors have surprisingly found that in case the copolymer or aqueous dispersion according to the present invention is incorporated into the coating composition, the properties of the coating formed by the coating composition are not adversely affected. As compared to the coating composition without the incorporation of the copolymer or aqueous dispersion of the present invention, the coating composition incorporating the copolymer or aqueous dispersion has comparable stability of paint, and the coating formed therefrom has a comparable adhesion to the substrate, and/or resistance to chemicals, such as resistance to ethanol, acid, base, coffee, water, and black tea. Preferably, the coating formed with the coating composition incorporating the copolymer or aqueous dispersion of the present invention has better mechanical properties, such as pencil hardness, as compared to a coating composition without copolymer or dispersion according to the present invention.

According to still another aspect of the present invention, the invention also relates to an article comprising a substrate and a coating thereon comprising the aqueous dispersion or coating composition according to the present invention. The substrate may be any coatable material. One of ordinary skill in the art will select and determine the appropriate material as a substrate depending on the actual needs. In some embodiments, the substrate may be a wood substrate, a plastic substrate, a metal substrate, or a building wall.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples are commercially available and used directly without further treatment.

Materials

The materials used in the Examples are listed in Table 1 below.

| Components | Abbreviations | Suppliers |
|---|---|---|
| 2-(acetoacetoxy)ethyl methacrylate | AAEM | Eastman |
| methyl methacrylate | MMA | Badford |
| methacrylic acid | MAA | Badford |
| sodium dodecyl sulfate | SDS | Aladdin |
| 1-dodecanethiol | DT | Aladdin |
| ammonium persulfate | APS | Aladdin |
| deionized water | DIW | — |
| aqueous acrylic latex with formaldehyde scavenging functional groups | SF506 | Dow |

Test Methods

Particle size is measured by the Brooks 90Plus PALS dynamic light scattering instrument and reported as the average of the measured particle sizes of the tested sample.

Molecular weight is measured by HPLC Agilent 1260 gel chromatography (GPC) system and reported as number average molecular weight (Mn).

Tg is measured by the TA DSC Q2000 system and reported as the glass transition temperature of the resin.

Free formaldehyde content is determined by the following method: the sample is dissolved in 1:1 mixture of tetrahydrofuran (THF) and acetonitrile (ACN), followed by derivation with 2,4-dinitrophenyl hydrazine. And then a High performance liquid chromatography (HPLC) having a UV detector is used to measure its formaldehyde content.

Resistance

The test liquid is added dropwise to a 6-layer coin-sized filter paper set on the surface of the coating formed on the sample. After soakage for 1 hour, the surface of the coating is visually checked to determine its resistance. According to the present invention, the test liquid may comprise 50% aqueous ethanol solution, 50 g/L aqueous $NaHCO_3$ solution, acetic acid aqueous solution, deionized water, coffee and red tea water.

Pencil Hardness

The pencil hardness is assessed using the PPH-750B Pencil Hardness Tester from Shanghai Modern Environmental Engineering Technology Co., Ltd. The pencil for testing can be a CHUNG HWA drawing pencil from China First Pencil Co., Ltd., Shanghai.

Example 1

Preparation of the Aqueous Dispersion

Under a hybrid atmosphere of air and oxygen, the ingredients in below Table 2 were added into a four-neck flask equipped with a thermometer, overhead stirrer, and gas inlet at room temperature. The mixture is heated to 60-85° C. and stirred for 4-8 hours. Then the mixture is cooled to 50° C. and adjusted with ammonium hydroxide to pH of 7.0 to 8.0, yielding the aqueous dispersions S1-S3.

TABLE 2

| | | Parts by Weight | | |
|---|---|---|---|---|
| Item# | Materials | S1 | S2 | S3 |
| 1 | AAEM | 250 | 300 | 350 |
| 2 | MMA | 200 | 155 | 65 |
| 3 | MAA | 40 | 45 | 35 |
| 4 | APS | 1 | 1 | 1 |
| 5 | SDS | 2 | 2 | 2 |
| 6 | DT | 13 | 13 | 6 |
| 7 | DIW | 1000 | 1000 | 1000 |

The properties of the resulting aqueous dispersions are listed in below Table 3.

TABLE 3

| | Solids Content (%) | pH | Particle size (nm) | Molecular weight | Tg (° C.) |
|---|---|---|---|---|---|
| S1 | 31 | 7.5 | 19 | 9900 | 76 |
| S2 | 31 | 7.8 | 21 | 10500 | 71 |
| S3 | 31 | 8.1 | 28 | 14800 | 67 |

Example 2

Formaldehyde Scavenging Ability of Aqueous Dispersions

A certain amount of the aqueous dispersions S1, S2, S3 obtained in Example 1 or commercially available aqueous latex SF506 is separately added to deionized water containing a certain amount of formaldehyde and, diluted to 500 ml in a volumetric flask. After standing at room temperature for 5 days, the free formaldehyde content of each sample is tested. The formaldehyde scavenging amount per gram of aqueous latex or aqueous dispersion is calculated according to the following formula.

Formaldehyde scavenging amount/g aqueous latex $$\text{Formaldehyde scavenging amount/g aqueous latex} = \frac{\text{initial formaldehyde amount} - \text{residual formaldehyde amount}}{\text{amount of polymer in the tested sample}}$$

The results were shown in below Table 4.

TABLE 4

| | Formaldehyde scavenging amount/g polymer in the tested sample |
|---|---|
| S1 | 20 mg |
| S2 | 24 mg |
| S3 | 31 mg |
| Dow SF506 | 2 mg |

It can be seen that the aqueous dispersion according to the present invention has a significantly higher formaldehyde scavenging effect as compared to the existing formaldehyde-scavenging aqueous latex.

Example 3

Formaldehyde Scavenging Ability of Aqueous Dispersions in an Aqueous Coating Composition The formaldehyde scavenging ability of the aqueous dispersion of the present invention is tested. The aqueous dispersions S1 synthesized in the present invention is blended with a commercially available water-based wood paint and a wall paint in an amount of 1% or 3%, respectively. Then, 50 g of formaldehyde solution (formaldehyde content 1200 ppm) is added to 50 g of paint for wood and architectural coatings, respectively. After these solutions are stored at room temperature for 5 days, the free formaldehyde content is measured. The results are shown in Table 5.

TABLE 5

| | Free-formaldehyde content (ppm) | | |
| --- | --- | --- | --- |
| Item # | Without adding | With adding 1% | With adding 3% |
| Wood paint | 590 | 210 | 56 |
| Wall paint | 570 | 196 | 45 |

From the above results, it can be seen that the aqueous dispersion according to the present invention can remarkably reduce the formaldehyde content of the commercial aqueous coating composition and has excellent formaldehyde scavenging ability.

Example 4

Properties of Coatings

For each sample of the aqueous dispersion S1-S3 of the present invention, 3% by weight of aqueous dispersion is added to the water-based wood paint. After the formation of film, the properties of each film were tested. In contrast, as a comparative experiment, a water-based wood paint without addition of the aqueous dispersion of the present invention is also subjected to the formation of film under the same conditions and tested for the properties. The results are shown in Table 6.

TABLE 6

| | Comp. Exp. | Sample S1 | Sample S2 | Sample S3 |
| --- | --- | --- | --- | --- |
| Pencil hardness | 2B | HB | HB | HB |
| Anti-water | pass | pass | pass | pass |
| Anti-coffee | pass | pass | pass | pass |
| Anti-dark tea | pass | pass | pass | pass |
| Anti-alkali | pass | pass | pass | pass |
| Anti-alcohol | pass | pass | pass | pass |
| Anti-acid | pass | pass | pass | pass |

It can be seen that the addition of the aqueous dispersion according to the present invention does not adversely affect the initial aqueous paint and may even improve the pencil hardness of the coating.

The complete invention of all patents, patent applications, and publications, and electronically available material cited herein are incorporated by reference. The foregoing detailed description and examples have been given for clarity of understanding only. No unnecessary limitations are to be understood therefrom.

While the invention has been described with respect to a number of embodiments and examples, those skilled in the art, having benefit of this invention, will appreciate that other embodiments can be devised which do not depart from the scope and spirit of the invention as disclosed herein. The invention is not limited to the exact details shown and described, for variations obvious to one skilled in the art will be included within the invention defined by the claims. The invention illustratively disclosed herein suitably may be practiced, in some embodiments, in the absence of any element which is not specifically disclosed herein.

What is claimed is:

1. An aqueous dispersion comprising: particles of acrylic copolymer comprising one or more acetoacetyl functional groups and one or more hydrophilic groups chemically bonded to its molecular backbone,
   wherein the acrylic copolymer has a number average molecular weight of between 2000-100,000 g/mol;
   wherein the acrylic copolymer comprises between from 10 wt % to 30 wt % of the acetoacetyl functional groups relative to the weight of the acrylic copolymer;
   wherein the aqueous dispersion is prepared through emulsion polymerization using monomers comprising at least one ethylenically unsaturated monomer;
   wherein the at least one ethylenically unsaturated monomer has an anionic hydrophilic group;
   wherein the anionic hydrophilic group is selected from the group consisting of carboxyl group, sulfo group, phosphinate group, phosphono group, and phosphonic acid group; and
   wherein the particles have an average particle size of no greater than 50 nm, as measured by dynamic light scattering method.

2. The aqueous dispersion according to claim 1, wherein the particles are prepared through emulsion polymerization using monomers comprising:
   i) 30 to 90 wt % of at least one ethylenically unsaturated monomer comprising a C($=$O)CH2C($=$O)— functional group;
   ii) 0.1-15 wt % of at least one ethylenically unsaturated monomer comprising a hydrophilic group; and
   iii) 0-60 wt % of at least one further ethylenically unsaturated monomer other than monomers i) and ii),
   wherein the wt % is relative to the total weight of the monomers i), ii) and iii).

3. The aqueous dispersion according to claim 2, wherein, the ethylenically unsaturated monomer i) is present in an amount of 45 to 85 wt % relative to the total weight of the monomer i), ii) and iii).

4. The aqueous dispersion according to claim 2, wherein the ethylenically unsaturated monomer i) comprises Ci-8 alkylene (meth)acrylate acetoacetate.

5. The aqueous dispersion according to claim 1, wherein the ethylenically unsaturated monomer ii) is selected from the group consisting of acrylic acid, methacrylic acid, beta-acryloxy propionic acid, ethacrylic acid, alpha-chloroacrylic acid, crotonic acid, alpha-phenylacrylic acid, cinnamic acid, chlorocinnamic acid, and the combination thereof.

6. The aqueous dispersion according to claim 1, wherein the ethylenically unsaturated monomer ii) is present in an amount of 1 to 12 wt % relative to the total weight of the monomer i), ii) and iii).

7. The aqueous dispersion according to claim 2, wherein the ethylenically unsaturated monomer iii) is selected from the group consisting of styrene, alpha-methylstyrene, vinyltoluene, vinylnaphthalene, vinyl acetate, vinyl versatate, acrylonitrile, methacrylonitrile, $C_{1-20}$ alkyl esters of (meth)acrylic acid, alkoxyalkyl (meth)acrylate and the combination thereof.

8. The aqueous dispersion according to claim 7, wherein the ethylenically unsaturated monomer iii) is present in an amount of 0.1 to 45 wt % relative to the total weight of the monomer i), ii) and iii).

9. The aqueous dispersion according claim 1, wherein the particles has a glass transition temperature of 50° C. or more.

10. The aqueous dispersion according to claim 1, wherein the aqueous dispersion has a total solids content of 25-55%.

11. The aqueous dispersion according to claim 1, wherein the aqueous dispersion has a pH in the range of 7 to 9.

12. A coating composition comprising the aqueous dispersion of claim 1.

13. The aqueous dispersion of claim 1, wherein the aqueous dispersion is a formaldehyde scavenger.

14. An article comprising a substrate and a coating thereon comprising the aqueous dispersion of claim 1.

15. The article according to claim 14, wherein the substrate is selected from the group consisting of wood, plastic, metal and architectural substrate.

16. An acrylic copolymer comprising one or more acetoacetyl functional groups and one or more hydrophilic groups chemically bonded to its molecular backbone,
wherein the acrylic copolymer has a number average molecular weight of 2000-100000 g/mol;
wherein the acrylic copolymer comprises between 10 wt % and 30 wt % of the acetoacetyl functional groups relative to the weight of the acrylic copolymer;
wherein the aqueous dispersion is prepared through emulsion polymerization using monomers comprising at least one ethylenically unsaturated monomer;
wherein the at least one ethylenically unsaturated monomer has an anionic hydrophilic group;
wherein the anionic hydrophilic group is selected from the group consisting of carboxyl group, sulfo group, phosphinate group, phosphono group, and phosphonic acid group; and
wherein the acrylic copolymer comprises particles having an average particle size of no greater than 50 nm, as measured by dynamic light scattering method.

17. The acrylic copolymer according to claim 16, which has the following formula I:

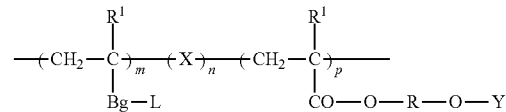

in which each $R^1$ independently represents H or methyl; Bg represents a divalent organic moiety or Bg is void; L represents a hydrophilic group; R represents a divalent saturated hydrocarbyl having 1 to 20 carbon atoms; Y represents acetoacetyl; and X represents a structural unit derivable from further ethylenically unsaturated monomers other than ethylenically unsaturated monomers containing —C(=O)CH2C(=O)— functional group and ethylenically unsaturated monomers containing a hydrophilic group L, and
wherein the structural units are connected with each other in arbitrary order, the subscripts m, n and p represent the statistic sum of the corresponding structural units, respectively, with m being an integer in the range of 1 to 15, n being an integer in the range of 0 to 40 and p being an integer in the range of 15 to 80.

18. The copolymer according to claim 17, wherein m is an integer from in the range of 1 to 15, n is an integer in the range of 10 to 40 and p is an integer in the range of 20 to 60.

* * * * *